Patented Sept. 7, 1954

2,688,603

UNITED STATES PATENT OFFICE 2,688,603

COPPER-OXIDE CATALYST

Maynard M. Baldwin, Columbus, Ohio, assignor, by mesne assignments, to Mathieson Chemical Corporation, Baltimore, Md., a corporation of Virginia No Drawing. Application April 24, 1948,
Serial No. 23,131

3 Claims. (Cl. 252—476)

This invention relates to a catalyst and to a method of preparing this catalyst, as well as to a novel method of catalyzing the oxidation of olefins which employs this new catalyst.

The preparation of catalysts by the deposition of metals or metal compounds on refractory materials, known as supports, is common in the art. However, no significant attention has been given, in the preparation of catalysts of this type, to the use of particular types of compounds and use of these compounds at low concentrations on the supports to improve the efficiency and specificity of the catalysts.

It is a primary object of this invention, therefore, to provide a catalyst having superior activity, improved stability of activity, and improved specificity.

Another object of this invention is to provide a catalyst capable of catalyzing the oxidation of olefins. Still another object of this invention is to provide a catalyst having good stability at relatively high temperatures.

Other objects and advantages of the present invention will become apparent to those skilled in the art from the detailed description thereof as set forth hereinafter.

It has been discovered that a highly active catalyst capable of promoting both difficult and desirable chemical reactions can be made by distributing an organic compound having a large molecular volume and containing a potentially catalytically active metal over the surface of a suitable support, and decomposing this precursor to remove the organic portion of the molecule.

The novel results obtained by the catalyst comprising the present invention are believed to be due to the size (volume) of the precursor molecule and also to the relative isolation of the metal atom within the precursor from other metal atoms. Organic metallic compounds which are suitable as precursors are those in which each metal atom is chemically combined with at least two organic groups each containing four or more non-metallic atoms in a chain or cyclic structure. The metal which constitutes a portion of the precursor must, of course, be capable of catalytic activity. Metals which are characterized by catalytic properties, are commonly classified as those metals which possess at least one differentiating electron in the second from the outermost shell, or penultimate shell. Such a classification is set forth, for example, in the patent to Huffman, No. 2,437,533, issued March 9, 1948. The class of metals having their differentiating electrons in the penultimate shell includes scandium, titanium, vanadium, chromium, manganese, iron, cobalt, nickel, copper, zinc, yttrium, zirconium, columbium molybdenum masurium, ruthenium, rhodium, palladium, silver, cadmium, lanthanum, hafnium, tantalum, tungsten, rhenium, osmium, iridium, platinum, gold, mercury, actinum, thorium and uranium.

Taking the metal copper as an example, compounds which may be used as suitable precursors include copper phthalocyanine, copper hydroxyquinoline, copper complex of bis-acetoacetonylethylenediamine, copper caproate, copper 2-ethylhexoate, copper stearate, copper salt of uric acid, copper bonzoate, copper diphenate, copper quinolate, copper salts of amino sulfonic acid such 4-aminotoluene-3-sulfonate and copper 2-amino-5-naphthol-7-sulfonate, copper amino acetate, copper amino benzoate, copper resinate, copper salts of acids such as adipic, azelaic, aconitic and aurin tricarboxylic acid, and their complexes with ethylenediamine.

This list of compounds is not exhaustive, and similar or comparable compounds including the other metals of the named class may be employed. For example, suitable precursors may be obtained from the 8-hydroxyquinoline complexes with scandium, titanium, vanadium, chromium, manganese, iron, cobalt, nickel, copper, zinc, yttrium zirconium, columbium, molybdenum ruthenium, rhodium, lead, silver, cadmium, lanthanum, hafnium, tantalum, tungsten, gold, mercury, actinum, thorium, palladium, and uranium. The copper cobalt, manganese, iron, cadmium, lead, and nickel salts, of the naphthenic acids may also be employed.

Further examples of suitable precursors are bis-dimethyl glyoxime cobalto chloride; lanthanum hexa-antipyrine iodide; dipyridyl perrhenate; nitron complex with rhenium; benzidene complex of osmium; dibenzyl mercury; diphenyl mercury; phenyl mercury propionate; anthranilates of zinc, cobalt, nickel, cadmium, manganese, copper, lead and mercury; the thorium and lead salts of picrolonic acid; nickel and lead dimethylglyoximes; copper, cadmium, zinc, uranium, lead, silver, manganese, nickel, cobalt, iron, chromium and titanium salts of quinaldinic acid; salicylaldoxine of copper and platinum; cupferone complex of iron copper, zinc, thorium, tantalum, and vanadium; mercaptobenzthiazol complex of gold; dithizon complexes of copper, mercury, cobalt, zinc, nickel, cadmium, manganese, iron, lead, palladium, and platinum; in addition to complexes of almost all of these metals with naphthaquinonedioxime.

Most satisfactory results have been obtained with precursors in which the metal is combined with the organic radicals both through primary and through secondary valence bonds. These "complexes" appear to impart greater isolation to the metal atom. Precursors satisfactory for the present invention may thus be broadly defined as organic compounds containing a metal which has its differentiating electron in the penultimate shell and which is chemically combined with at least two organic groups each containing four or more non-metallic atoms in a chain or cyclic structure. Precursors are preferred, however, which in addition to answering the above requirements, contain metal atoms which are combined with the organic radicals both by primary and secondary valence bonds.

The present invention is concerned with the support employed only to the extent of the effect of that support upon the catalytic action of the catalyst. Consequently, any of the more commonly used supports which are widely known in the field of catalysis may be employed, such as alumina, magnesia, silica, zirconia, titania, thoria, alumina gel, silica gel, kieselguhr, and various clays. The most satisfactory results have been obtained, however, with porous refractory supports. Pumice has proven to be particularly satisfactory.

The distribution of the precursor over the support or carrier may take many forms, as long as the ultimate aim of obtaining a very thin layer of uniformly distributed precursor over the support surface is satisfied. Preferably, the precursor is dissolved in some solvent to effect a molecular dispersion therein and then applied in a dilute solution to the surface of the support. Precursors which cannot be conveniently dissolved in a suitable solvent may be dispersed in a slurry and applied in this form to the support material.

After the precursor has been applied in a thin layer to the surface of the support, the precursor-coated support is heated to remove the organic portion of the precursor molecule. It is critical, however, that only a small amount of metal or metal compound (not materially greater than 2 grams of metal per 100 cc. of supported catalyst) formed from the precursor remain on the support. The residue remaining after heating is believed to be the metal oxide or the pure metal itself, although it is impossible to determine exactly the chemical composition of the residue. It is known, however, that the organic portion of the precursor molecule is decomposed and driven off and that the residue contains the metal portion of the precursor molecule. The particular temperature and time required to decompose the precursor will vary in each instance with the particular precursor involved. Some precursors are known to decompose at temperatures as low as 100° F. whereas other precursors do not show visible signs of decomposition until temperatures in excess of 600 F. are reached. Catalysts produced in accordance with the manner above described have a wide variety of uses. For example, these catalysts are suitable for catalyzing the oxidation of compounds such as the olefins, aralkyls, aryls, alkyl, heterocyclics, and the dehydrogenation of alcohols. More specifically, these catalysts may be used for synthesizing the production of benzaldehyde from toluene, phenol from benzene, acrolein from propylene, and methacrolein from isobutylene.

In order to more clearly set forth the present invention and to better enable those skilled in the art to practice the same, the following detailed description of the production of methacrolein from isobutylene is set forth. Pumice was crushed in a crushing roller and screened. The 8 to 16 mesh material was used as the catalyst support. This support material was boiled in concentrated nitric acid for 30 minutes and then washed with water and dried prior to coating with a catalyst precursor.

The coating of the pumice was effected by adding thereto an aqueous 22.9% copper phthalocyanine slurry containing approximately 200 milliliters of water. The catalyst was dried and then placed in a reaction tube and air passed therethrough for a period of approximately 4 hours and at a temperature of 350 to 400° C. The calculated concentration of the catalyst was 1.53 grams per 100 milliliters of support, on the basis of a copper oxide formation, or 1.22 grams for 100 milliliters on the basis of free copper.

Following the oxidation of the precursor, a gas mixture containing 9 parts of air and 1 part of isobutylene was passed through the catalyst for a period of 2½ hours at a temperature of approximately 325° C. Yields of 32% were obtained under these conditions. The flow rate of the gases through the catalyst bed was approximately 250 milliliters of total gas per hour per liter of catalyst.

Considerable variation in the above limitations may be made without adversely affecting the course of the reaction. For example, the temperature may be varied from 270 to 475° C., although it is preferred to maintain the temperature at 325 to 400° C. The optimum for synthesizing acrolein from propylene is 325° C., whereas the optimum for the synthesis of methacrolein from isobutylene is about 380° C. The rate of flow may vary broadly from 200 to 800 milliliters of total gas per hour per liter of catalyst, although it is preferred to maintain the rate of flow within a range of 250 to 550 milliliters total gas per hour per liter of catalyst. The ratio of the air to the olefin may vary from as much as 3:1 to 12:1 although a ratio of 9:1 is preferred because this appears to be approximately the stoichiometric amount of oxygen required for the synthesis. The above limitations apply also to the production of acrolein from propylene.

The criticalness of the size of the molecule of the precursor may be brought out by comparing the results obtained in the above example using copper phthalocyanine with results obtained when copper nitrate is employed. A copper nitrate precursor was dissolved and distributed upon a pumice support in a manner identical with that described above in connection with the copper phthalocyanine. After the copper nitrate was decomposed by heat, the catalyst was employed to oxidize isobutylene to methacrolein. The highest yields obtainable with this catalyst were only around 14% when the free copper in the catalyst equalled or approximated the free copper in the copper phthalocyanine.

It is believed that some explanation of the theory in back of the operation of this catalyst is important in carrying out the actual practice of the present invention. Once this theory is understood, wide application of this invention will become immediately apparent to those skilled in the art. Catalysis is admittedly largely a surface phenomenon. The most generally accepted theory of catalysis is that there exists a multitude of "active centers" on each catalyst which are sources of activation energy for the chemical reactants that are absorbed and desorbed at these points to effect the desired reactions. It is believed that these active centers consist of a somewhat different crystal formation from the surrounding material and therefore have the peculiar characteristic of absorption and desorption so vital in catalysis. The activity of a catalyst is determined by the number of active centers per weight or per volume of catalyst.

In the present invention the metal in the precursor is surrounded by organic radicals. The precursor is then spread thinly over a support surface and decomposed, leaving relatively isolated deposits of metal or metal oxides upon the surface of the support. Because of the extremely high state of division of the metal in the precursor, sometimes approaching molecular division, a much greater surface area per weight of metal is obtained. Consequently, there is a greater surface upon which active centers may occur. Also because of the relative isolation of the metal molecule, there is a greater probability of their being in the active state.

This theory is borne out by actual observations. As above stated, catalysts comprising the present invention are more active than catalysts of the prior art. Furthermore, high temperatures have little effect on these catalysts. This can be explained by the fact that because of their relative isolation there can not be melting together of adjacent metal deposits so as to destroy active centers by sintering. In addition, the isolation of the metal deposits as shown by the fact that the small molecules, such as copper nitrate which do not afford opportunity for isolation of the metal, do not have the increased activity of these larger molecules. Furthermore, it has been found that higher concentrations of the precursor on the surface of the support decrease the activity of the catalyst rather than increase it. In terms of the above set forth theory, this means that too high concentrations of the precursor cause overlapping deposits of metal residue and thus decrease the probability of formation of the active centers which otherwise would increase the catalytic action.

It is apparent from the above description that the present invention relates to a catalyst composed of a support and a residue formed in situ upon a support by decomposition thereon of a layer of an organic compound which contains a metal having its differentiating electron in the penultimate shell, and which is attached to at least two organic groups each having four or more non-metallic atoms in a chain or cyclic structure.

Included within the scope of this invention are precursors in which the above "organic groups" may be interconnected otherwise than at the metal. This catalyst is advantageous in that it is more active and makes possible new syntheses. Furthermore, this catalyst is active longer than the catalysts of the prior art. In addition, catalysts of the present invention are not effected by high temperatures, so that reactions may be run at a faster rate than heretofore. The extremely good yield obtained with these catalysts makes possible commercialization of processes heretofore thought impossible.

What is claimed is:

1. A catalyst prepared by thinly distributing over the surface of a support copper phthalocyanine, and heating the thus coated support in the presence of oxygen until the corresponding oxide of copper is formed, thereby effecting the removal of the organic portion thereof.

2. The method of making a catalyst which comprises the steps of preparing an intimately dispersed mixture of copper phthalocyanine in a liquid medium, immersing a support material in said mixture, removing and drying the support material to provide a thin layer of said copper phthalocyanine, and heating said layer of copper phthalocyanine until the corresponding oxide of copper is formed, thereby removing the organic portion thereof.

3. A method of preparing a catalyst which comprises the steps of preparing an intimately dispersed mixture of copper phthalocyanine in a liquid medium, applying a thin layer of said mixture to a suitable support material, and heating said layer of said mixture in the presence of oxygen until the copper phthalocyanine is changed to the corresponding oxide of copper.

References Cited in the file of this patent

UNITED STATES PATENTS

| Number | Name | Date |
| --- | --- | --- |
| 1,782,857 | Miller et al. | Nov. 25, 1930 |
| 1,896,320 | Luft | Feb. 7, 1933 |
| 1,937,728 | Storch | Dec. 5, 1933 |
| 2,040,782 | Van Peski | May 12, 1936 |
| 2,118,001 | Andrews | May 1, 1938 |
| 2,211,208 | Ipatieff et al. | Aug. 13, 1940 |
| 2,257,157 | Connolly | Sept. 30, 1941 |
| 2,383,711 | Clark et al. | Aug. 28, 1945 |
| 2,388,372 | Stewart | Nov. 6, 1945 |
| 2,402,440 | Owen | June 18, 1946 |
| 2,421,361 | Toussaint et al. | May 27, 1947 |
| 2,451,485 | Hearne et al. | Oct. 19, 1948 |
| 2,490,260 | Ehrhardt | Dec. 6, 1949 |